United States Patent [19]

Schmidt

[11] Patent Number: 5,121,862

[45] Date of Patent: Jun. 16, 1992

[54] CYCLE RACK

[75] Inventor: Erik Schmidt, Herning, Denmark

[73] Assignee: Erik Schmidt Autoilbehlor A/S, Herning, Denmark

[21] Appl. No.: 579,716

[22] Filed: Sep. 10, 1990

[51] Int. Cl.⁵ .............................................. B60R 9/10
[52] U.S. Cl. ....................... 224/42.03 B; 224/42.45 R; 269/97; 211/17
[58] Field of Search ......... 224/42.03 B, 273, 42.03 A, 224/42.03 R, 42.06, 42.45 R; 269/97, 201, 203, 228; 280/415.1, 512; 211/17 R, 18, 21, 22, 104, 145, 198; 248/434; 49/116, 122, 142, 207, 279; 160/67, 103, 154; 16/113, 321, 319, 324, 333, 346; D12/158

[56] References Cited

U.S. PATENT DOCUMENTS 4,299,341 11/1981 Copeland et al. ............ 224/42.03 B

FOREIGN PATENT DOCUMENTS

| 148531 | 7/1985 | Denmark . |
| 9012704 | 11/1990 | PCT Int'l Appl. . |
| 217015 | 6/1924 | United Kingdom .................. 16/333 |
| 2182619 | 5/1987 | United Kingdom . |

Primary Examiner—Henry J. Recla
Assistant Examiner—Glen T. Barrett
Attorney, Agent, or Firm—Antonelli, Terry Stout & Kraus

[57] ABSTRACT

A lockable toggle joint (4,5) for a cycle rack with pair of scissor shaped branches (2, 3) and scissor joint (7, 71, 72) comprising suitably shaped holding means (8A, 5 8B) for the holding of the rack to a conventional trailer ball hitch (1) at the rear of an automobile and carrying means (2A, 3A) for the bicycles comprises snaplock and interlock means (6) which is lockable.

17 Claims, 3 Drawing Sheets

CYCLE RACK

FIELD OF THE INVENTION

The present invention relates to a cycle rack including a lockable toggle joint providing a mutually tensioned spacing between two longitudinally extending branches of a pair of holding means for holding at least one bicycle during transportation thereof, with the cycle rack being arranged above a trailer ball hitch means of an automobile, and with the toggle joint including at least two toggle levers pivotable around a common hinge joint and mutually pivotable with respect to joining branches which, at their opposite ends, are each connected to one of the two longitudinally extending branches of the holding means.

SUMMARY OF THE INVENTION

The present invention relates to a cycle rack employing a toggle joint arrangement, with the cycle rack including a fork shaped holding means capable, with sufficient force, to safely hold at least one bicycle onto an above a commonly used trailer ball hitch provided at the rear of an automobile for pulling a trailer or caravan behind the automobile, when the automobile is used without any trailer or caravan, in which case, the ball shaped hitch means is present as a free element, i.e., non-used element, on the rear of the automobile.

The purpose of the invention is to provide a comparatively inexpensive and easily manufactured holding means capable, without undue twisting of the two longitudinally extending branches of the holding means, to hold these branches fixed in position onto and preferably, above the ball shaped hitch means, so that, when fixed in position, the two longitudinally extending branches are kept in a fixed position in relation to the automobile. Carrying means for the bicycle in the form of, for example, horizontally rearwardly and upwardly protruding carrying rods or beams are provided on the respective branches. The toggle joint according to the invention may be locked by an attachable locking element so that stealing or unauthorized removal or loosening of the holding means can be prevented.

According to the invention, the lockable toggle joint is provided with a first joining branch having an extension thereof provided with a means, such as a bearing portion, able to abut against another means, such as an abutting portion, on the second joining branch located at a spaced distance from a common hinged joint. A third handle-like branch, located at a spaced distance from the common hinged joint is pivotably joined to the extension of the first joining branch and carries at least one snaplock means. The snaplock means are arranged so that the snaplock means, with the first and second joining branches through their pivotal movements being swung to provide the tension spacing of the toggle joint between the two longitudinally extending branches of the holding means, register and interlock, with a receiving snaplock means being located on the first joining branch.

To further reduce any twisting of the two longitudinally extending branches, the first and second joining branches each may be composed of two parallel spaced branch elements for providing guiding and non-twisting of the two longitudinally extending branches of the holding means. Embodiments according to the invention may also be provided with the longitudinally extending branches being shaped in one or more bent portions so as to avoid a covering of the view from the rear of the automobile license plates positioned above the ball shaped hook means and which could be covered from view through straight rod-shaped longitudinally extending branches protruding obliquely upwardly from the ball shaped hook means. If the longitudinal branches are given a bent shape, their capability to provide a sufficient stiff holding of the at least one bicycle is reduced, because the branches have to present a greater length and also because the branches may more easily be twisted. Through the application of the invention, this twistability is considerably reduced.

Various locking means may be used in connection with the embodiments according to the present invention. Without in any way to be exhaustive some probable embodiments of applicable locking means are described in connection with some exemplified embodiments according to the invention which are described as follows with reference to the accompanying drawings.

DETAILED DESCRIPTION

Figure 1:
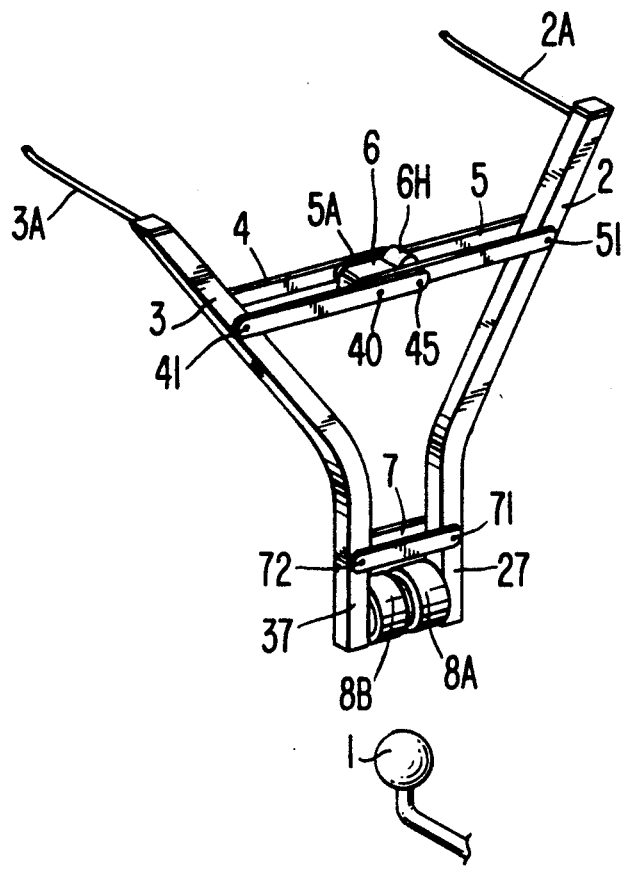
FIG. 1 is an exploded perspective view of an embodiment according to the invention of a cycle rack to be mounted on a trailer ball hitch.

Referring now to the drawings wherein like reference numerals are used throughout the various views to designate like parts and, more particularly, to FIG. 1, according to this figure, a trailer ball hitch 1 of the type located on the rear of automobiles for trailing caravans, trailers, etc has a cycle rack constructed in accordance with the present invention mounted on the ball thereof in a tensioned condition. The cycle rack includes branches 2, 3 having lower portions 27, 37 located below a fishplate link connecting means 7 linked to the branches 2, 3 at 71, 72. Annular holding means 8A, 8B are arranged internally between the branches 2, 3 with the annular holding means 8A, 8B being capable, in the illustrated tensioned condition, of clamping the cycle rack to hold the ball hitch 1. Arm means 2A, 3A are provided at the upper ends of the branches 2, 3 to carry the bicycles.

A toggle joint is provided between the upper portions of the branches 2, 3, with the toggle joint comprising two toggle branches 4, 5 pivotally connected at 41, 51 to the branches 2, 3. These two toggle branches 4 and 5 share a common link bolt 45 mutually linking the two branches together. The toggle joint, shown in the closed condition in FIG. 1, provides tension between the branches 2 and 3 at 41 and 51 thereby enabling the lower portions of the branches 2, 3 through the annular holding means 8A, 8B, to squeeze the ball hitch 1 between them due to the fishplate arrangement 7, 71, 72 serving as a bearing for the branches 2 and 3. The toggle joint is opened to widen the annular holding means 8A and 8B away from each other by pushing the common link bolt 45 upwards and thereby swinging the toggle joint branches 4, 5 around bearings 41 and 51, making mounting and removal of the cycle rack possible.

The toggle joint branches 4, 5 are kept in tensioned condition by a snaplock member 6 located on an extension 5A of the toggle branch 5.

Figure 2:
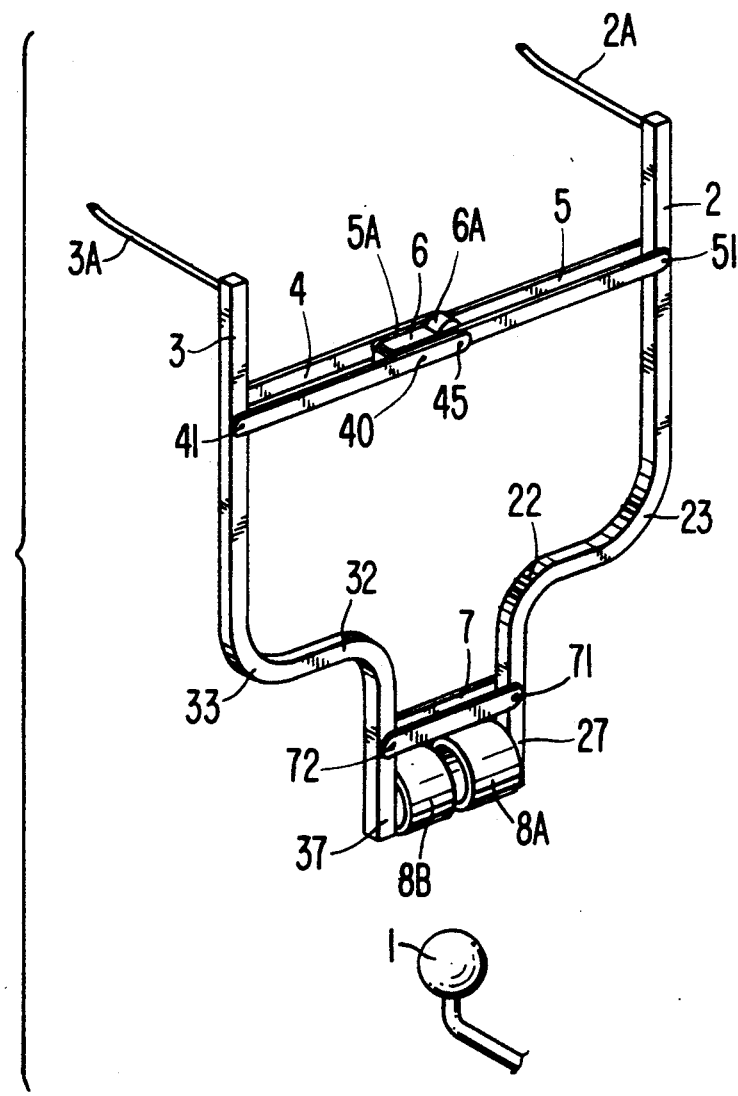
FIG. 2 is an exploded perspective view of another embodiment of a cycle rack according to the invention.
Figure 4:
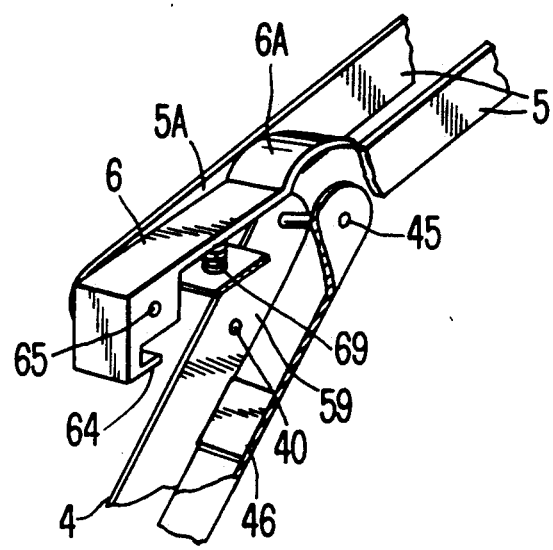
FIG. 4 is a partial cutaway perspective view of a toggle joint of FIG. 3.
Figure 3:
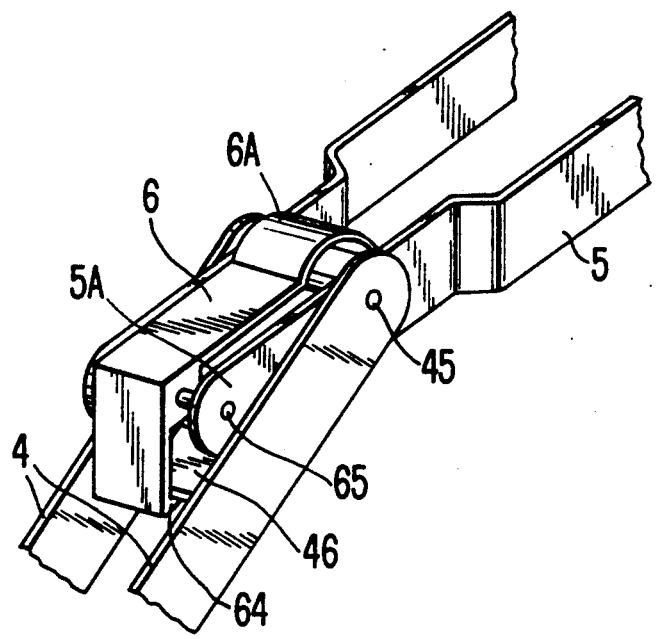
FIG. 3 is a perspective view of a partly open toggle joint of the cycle rack according to FIG. 1 or FIG. 2.

As shown most clearly in FIGS. 3 and 4, the snaplock means is pivotably connected to an extension 5A of the toggle joint branch 5 at bearing portion 65. The snaplock member 6 is angular shaped with the link bolt located close to the angular bending of the snaplock member 6. The lower portion, according to FIGS. 3 and 4, of the snaplock member 6 is, at 64, provided with a hooked shaped portion adapted to grip under an abutting portion of the other toggle branch 4 when the two toggle branches 4, 5 are swung to the tensioning position shown in FIGS. 1 and 2. The abutting portion 46 of the toggle branch 4 simultaneously abuts against the material portion of the snap lock member 6 just below the bearing portion 65. By downward pressing on a handle shaped portion 6H of the snaplock member 6, the snaplock member 6 pivots around the bearing portion 65 and disables the hook shaped portion 64 from the abutting portion 46 which makes it possible to push the common link bolts 45 upwards for opening of the toggle joint.

In FIG. 4, a spring means 69 provides a pushing force between the snaplock member 6 and a cross member 59 located on the extension 5A of the toggle branch 5 whereby the handle portion 6H is constantly urged upwardly thereby urging the hook shaped portion 64 in a gripping position together with the abutting portion 46 when the toggle joint is in a closed condition.

An opening or other interlock means for a padlock or other locking means may be located, for example, at 40, so that the snaplock member is prevented from being moved. The toggle branches 4, 5 and connecting means 7 are illustrated as composed of two parallel arranged branch members which, for example, may be made of flat iron. With such an arrangement, the twisting movements of the snaplock as well as the branches 2, 3 are avoided and a better holding of the cycle rack on the ball hitch 1 is provided.

This last feature is essentially important when an embodiment of the cycle rack as the one shown in FIG. 2 of the drawing is used. In FIG. 2, the branches are provided with two bent portions 22, 23 and 32, 33 thus providing an aperture between the branches 2, 3 so that the cycle rack does not cover the view of a license plate positioned at the rear of an automobile above the rear bumper.

Figure 5:
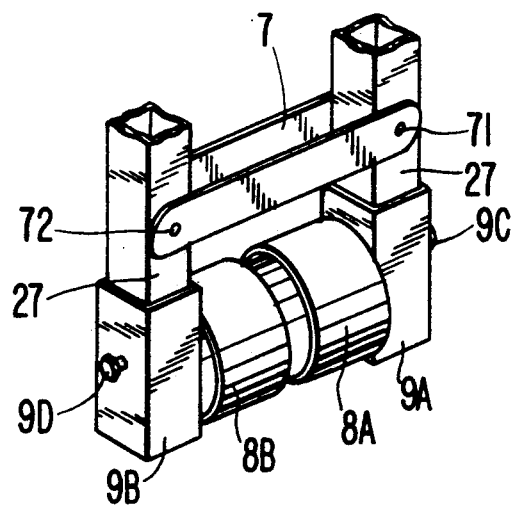
FIG. 5 is a perspective view of a lower portion of the cycle rack of FIGS. 1 or 2 fitted with exchangeable holding means for trailer ball hitches of different sizes.

In FIG. 5, a further development according to the invention is shown through which accommodation of the above mentioned embodiments according to the invention in case of a mounting of the cycle rack to a trailer ball hitch means of different sizes it to be achieved. Thus, in case the holding means 8A, 8B should have another size and thus, for example, should have other diameters of the annular shaped holding means or have different axial lengths of the annular holding means 8A, 8B, or also with possible means being inserted between the holding means 8A, 8B and the longitudinal branch portions 27, 37 or a combination thereof, the embodiment is shown in FIG. 5 may be advantageous. Thus, in FIG. 5, a pair of exchangeable holding means are provided with annular shaped holding means 8A, 8B.

To provide an easily performed exchangeability of the holding means according to FIG. 5, different sets of holding means 8A, 8B provided with tube shaped means 9A, 9B may be employed. The tube shaped means 9A, 9B may carry adequate fastening means such as, for example, set screws 9C, 9D or the like, adequately closely fitting around the lower portions 27, 37 of the branches 2, 3. The tube shaped means 9A, 9B may be slid up from below around the lower portions and through the tensioning of the fastening means 9C, 9D be maintained in position thereon. The means 9C, 9D could also be snaplock means, etc.

I claim:

1. A cycle rack for carrying at least one bicycle during transportation, the cycle rack being adapted to be arranged above and clamped to a spherical trailer ball hitch adapted to be mounted to a vehicle axis, the cycle rack comprising holding means for holding the at least one bicycle including two longitudinally extending branches, a pair of annular holding members adapted to engage a ball of the spherical trailer ball hitch, each of the pair of annular holding members being positioned at a lower portion of one of said two longitudinally extending branches, each of said annular holding members engaging said spherical trailer ball hitch on opposite sides of the ball means for pivotally connecting lower portions of said longitudinally extending branches to each other, and a lockable toggle joint means for clamping said holding means on the spherical trailer ball hitch under tension, said lockable toggle joint means including a first joining branch pivotally connected to one of said longitudinally extending branches, a second joining branch pivotally connected to the other of said longitudinally extending branches, a common hinge joint means for pivotally connecting said first and second joining branches, a third joining branch located at a distance from said common hinge joint means, and means for pivotally joining said third joining branch to said first joining branch, said third joining branch is provided with a bearing means adapted to abut against a portion of said second joining branch located at a distance from said common hinged joint means, and at least one snaplock provided on said third joining branch, whereby upon a pivotable movement of said first and second joining branches, to provide a tensioned spacing of the toggle joint means between the longitudinally extending branches of the holding means, said first and second joint branches are brought into alignment and are interlocked by said snaplock cooperating with a receiving snaplock located on said second joining branch whereby the cycle rack is clamped to the spherical trailer ball hitch.

2. A cycle rack according to claim 1, wherein said third branch is angularly shaped, said snaplock is provided on one angular end thereof, and wherein another end of the third joining branch is shaped so that the lockable toggle joint means is manually actuatable between a locked and unlocked position by displacement of the third joining branch.

3. A cycle rock according to claim 1, further comprising openings in said first and second joining branches, said openings being adapted to be brought into alignment when the lockable toggle joint means is in a locked position, and locking means insertable into said openings for locking of the lockable toggle joint means in the locked position.

4. A alignment according to claim 2, further comprising openings in said first and second joining branches, said openings being adapted to be brought into alignment when the lockable toggle joint means is in a locked position, and locking means insertable into said openings for locking of the lockable toggle joint means in the locked position.

5. A lockable toggle joint according to claim 1, further comprising spring means for urging said third joining branch to be swung through a pivotal movement to register and snaplock with the receiving snaplock of said second joining branch.

6. A lockable toggle joint according to claim 2, further comprising spring means for urging said third joining branch to be swung through a pivotal movement to register and snaplock with the receiving snaplock of said second joining branch.

7. A lockable toggle joint according to claim 3, further comprising spring means for urging said third joining branch to be swung through a pivotal movement to register and snaplock with the receiving snaplock of said second joining branch.

8. A lockable toggle joint according to claim 4, further comprising spring means for urging said third joining branch to be swung through a pivotal movement to register and snaplock with the receiving snaplock of said second joining branch.

9. A cycle rack according to claim 1, wherein said first and second joining branches each include two parallel spaced branch elements for providing guiding and non-twisting of the said two longitudinally extending branches of the holding means.

10. A cycle rack according to claim 2, wherein said first and second joining branches each include two parallel spaced branch elements for providing guiding and non-twisting of the said two longitudinally extending branches of the holding means.

11. A cycle rack according to claim 3, wherein said first and second joining branches each include two parallel spaced branch elements for providing guiding and non-twisting of the said two longitudinally extending branches of the holding means.

12. A cycle rack according to claim 4, wherein said first and second joining branches each include two parallel spaced branch elements for providing guiding and non-twisting of the said two longitudinally extending branches of the holding means.

13. A cycle rack according to claim 5, wherein said first and second joining branches each include two parallel spaced branch elements for providing guiding and non-twisting of the said two longitudinally extending branches of the holding means.

14. A cycle rack according to claim 6, wherein said first and second joining branches each include two parallel spaced branch elements for providing guiding and nontwisting of the said two longitudinally extending branches of the holding means.

15. A cycle rack according to claim 7, wherein said first and second joining branches each include two parallel spaced branch elements for providing guiding and nontwisting of the said two longitudinally extending branches of the holding means.

16. A cycle rack according to claim 8, wherein said first and second joining branches each include two parallel spaced branch elements for providing guiding and nontwisting of the said two longitudinally extending branches of the holding means.

17. A cycle rack for carrying at least one bicycle, said cycle rack being adapted to be arranged above and clamped to a ball of a spherical trailer ball hitch adopted to be mounted on a vehicle, the cycle rack comprising holding means for holding the at least one bicycle including a pair of longitudinally extending branches, means for pivotally connecting lower portions of the longitudinally extending branches to each other, and lockable toggle joint means for clamping said holding means on the spherical trailer ball hitch under tension, said lockable toggle joint means including a first joining branch pivotally connected to one of said longitudinally extending branches, a second joining branch pivotally connecting to the other of said longitudinally extending branches, a common hinge joint means for pivotally connecting said first and second joining branches to each other, a third joining branch located at a distance from said common hinge joint means, and means for pivotally joining said third joining branch to said first joining branch, said third joining branch is provided with a bearing means adapted to abut against a portion of said second joining branch located at a distance from said common hinged joint means, at least one snaplock provided on said third joining branch, whereby, upon a pivotable movement of said first and second joining branches, to provide a tensioned spacing of the toggle joint means between said longitudinally extending branches of the holding means, said first and second joint branches are brought into alignment and are interlocked by said snaplock with a receiving snaplock located on said second joining branch whereby said cycle rack is clamped to the spherical trailer ball hitch, and wherein the longitudinally extending branches of said holding means are provided with a pair of exchangeable annular holder members adapted for enabling an accommodation of differently sized spherical trailer ball hitches, each of said annular holding members being positioned at a lower portion of one of said two longitudinally extending branches, each of said annular holding members engaging said spherical trailer ball hitch on opposite sides of the ball.

* * * * *